United States Patent
DeKam et al.

(10) Patent No.: US 12,214,549 B2
(45) Date of Patent: *Feb. 4, 2025

(54) THREE-DIMENSIONAL PRINTING

(71) Applicant: Hewlett-Packard Development Company, L.P., Spring, TX (US)

(72) Inventors: Kevin P. DeKam, Corvallis, OR (US); Sterling Chaffins, Corvallis, OR (US); Cassady Sparks Roop, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,102

(22) Filed: Jul. 7, 2023

(65) Prior Publication Data

US 2023/0347586 A1 Nov. 2, 2023

Related U.S. Application Data

(63) Continuation of application No. 17/047,729, filed as application No. PCT/US2018/056116 on Oct. 16, 2018, now Pat. No. 11,712,845.

(51) Int. Cl.
| | |
|---|---|
| *B29C 64/165* | (2017.01) |
| *B33Y 10/00* | (2015.01) |
| *B33Y 70/00* | (2020.01) |
| *C09D 5/23* | (2006.01) |

(52) U.S. Cl.
CPC ............ *B29C 64/165* (2017.08); *B33Y 10/00* (2014.12); *B33Y 70/00* (2014.12); *C09D 5/23* (2013.01)

(58) Field of Classification Search
CPC ......... B33Y 70/00; B33Y 70/10; B33Y 10/00; B33Y 80/00; B82Y 25/00; B29C 64/165; B29C 64/112; B29C 64/153; B29C 64/135; B29C 64/20; B29C 64/40; B29C 64/22; B29C 64/291; B29C 2035/0283; B29C 2035/0822; B29C 2035/08555; B29C 35/08; B29C 35/0805
See application file for complete search history.

(56) References Cited

U.S. PATENT DOCUMENTS

| | | |
|---|---|---|
| 2004/0137203 A1 | 7/2004 | Adams et al. |
| 2007/0183918 A1 | 8/2007 | Monsheimer et al. |
| 2012/0235078 A1 | 9/2012 | Iftime et al. |
| 2015/0231825 A1 | 8/2015 | Swartz et al. |
| 2015/0366073 A1 | 12/2015 | Magdassi et al. |
| 2016/0198063 A1 | 7/2016 | Villwock |
| 2017/0200028 A1 | 7/2017 | Deak et al. |

FOREIGN PATENT DOCUMENTS

| | | | |
|---|---|---|---|
| CN | 101505220 A | 8/2009 | |
| WO | 98/22250 A1 | 5/1998 | |
| WO | 2015/185155 A1 | 12/2015 | |
| WO | WO-2016048375 A1 * | 3/2016 | ........... B29C 64/165 |
| WO | WO-2016165746 A1 * | 10/2016 | ........... B22F 1/0003 |
| WO | WO-2017019102 A1 * | 2/2017 | ............. B22F 10/28 |
| WO | 2017/131709 A1 | 8/2017 | |
| WO | WO-2017146740 A1 * | 8/2017 | ............. B28B 1/001 |
| WO | 2017/189306 A1 | 11/2017 | |

OTHER PUBLICATIONS

Yoon "Oxidation Kinetics and Magnetic Properties of Elemental Iron Nanoparticles" Part Part Syst Charact.; 30(8): 667-671, Aug. 2013. (Year: 2013).*

Yoon et al. "Oxidation Kinetics and Magnetic Properties of Elemental Iron Nanoparticles" Part Part Syst Charact .; 30 (8): 667-671, Aug. 2013. (Year: 2013).

* cited by examiner

*Primary Examiner* — Christopher M Rodd
(74) *Attorney, Agent, or Firm* — Dierker & Kavanaugh, P.C.

(57) ABSTRACT

The present disclosure is drawn to 3D printing kits, multi-fluid kits for 3D printing, and methods of making 3D printed articles. In one example, a 3D printing kit can include a powder bed material, a fusible fluid, and a magnetic fluid. The powder bed material can include polymer particles. The fusible fluid can include water and a radiation absorber. The fusible fluid can be to selectively apply to the powder bed material. The magnetic fluid can include magnetic particles, and the magnetic fluid can be to selectively apply to the powder bed material.

16 Claims, 5 Drawing Sheets

THREE-DIMENSIONAL PRINTING

CROSS REFERENCE TO RELATED APPLICATIONS

This application is a continuation of U.S. application Ser. No. 17/047,729, filed Oct. 15, 2020, which itself is a 371 National Stage Entry of International Application No. PCT/US2018/056116, filed on Oct. 16, 2018, the contents of each of which are incorporated herein by reference in their entirety.

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

DETAILED DESCRIPTION

Figure 1:
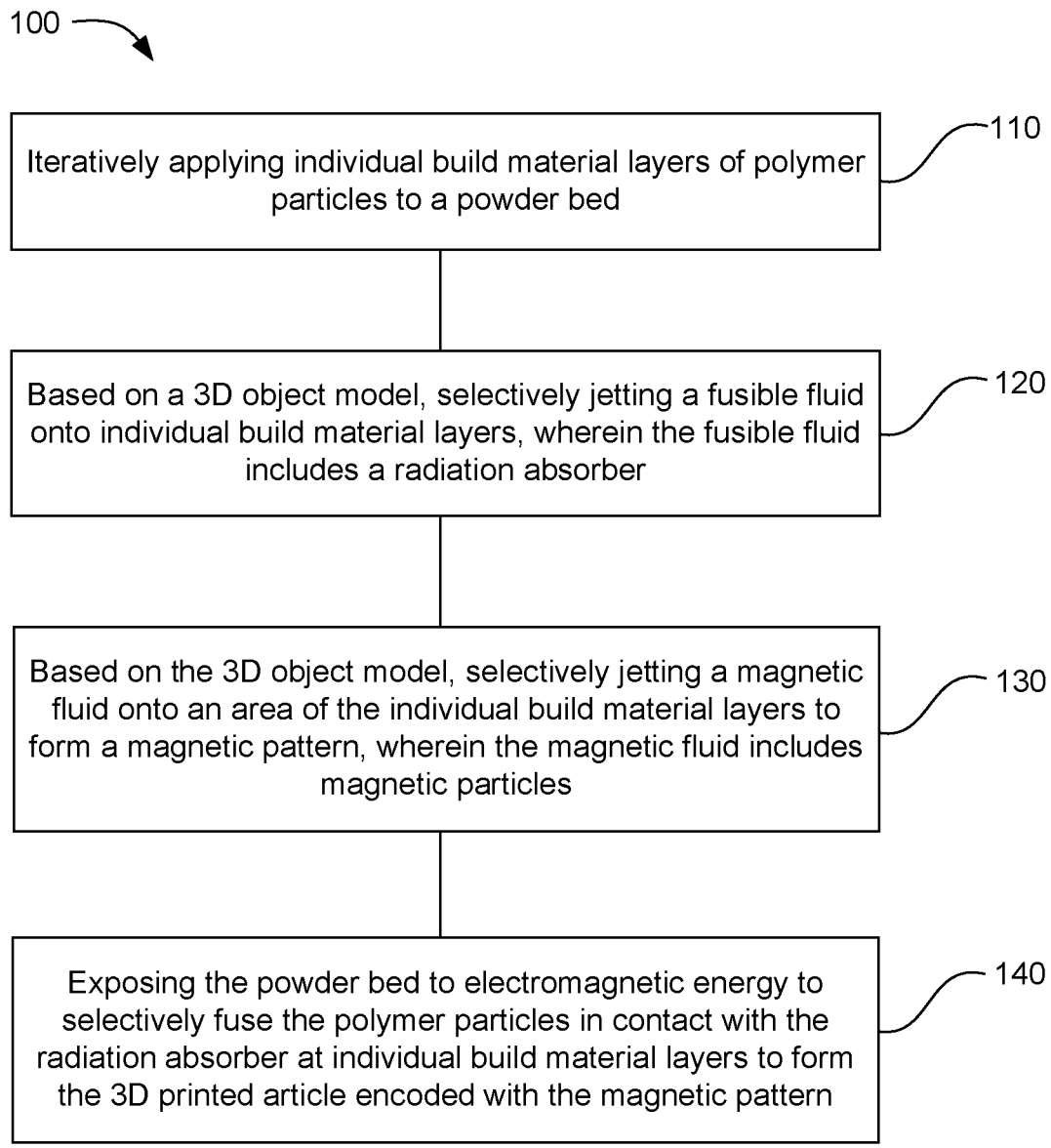
FIG. 1 is a flowchart illustrating an example method of making a 3D printed article in accordance with the present disclosure.

The present disclosure describes 3D printing with magnetic fluids to form 3D printed articles having magnetic patterns. In various examples, the present disclosure describes 3D printing kits, multi-fluid kits for 3D printing, and methods of making 3D printed articles. In one example, a 3D printing kit can include a powder bed material that includes polymer particles. The kit can also include a fusible fluid including water and a radiation absorber to selectively apply to the powder bed material. Additionally, the kit can include a magnetic fluid including magnetic particles to selectively apply to the powder bed material. In some examples, the polymer particles can have an average particle size from about 20 µm to about 100 µm and can include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, or a combination thereof. In further examples, the radiation absorber can include carbon black, a near-infrared absorbing dye, a near-infrared absorbing pigment, a tungsten bronze, a molybdenum bronze, metal nanoparticles, a conjugated polymer, or a combination thereof. In still further examples, the magnetic particles can include Fe, $Fe_3O_4$, $Fe_2O_3$, Co, Ni, $Nd_2Fe_{14}B$, $Y_2Fe_{14}B$, or combinations thereof. In another example, the kit can include a detailing fluid that includes a detailing agent to selectively apply to the powder bed material.

The present disclosure also describes multi-fluid kits for 3D printing. In one example, a multi-fluid kit for 3D printing can include a fusible fluid that includes water and a radiation absorber. The kit can also include a magnetic fluid including water and magnetic particles to selectively apply to the powder bed material. The kit can also include a detailing fluid including a detailing agent. In a further example, the radiation absorber can be capable of absorbing radiation to produce heat. In another example, the fusible fluid can be colorless. In yet another example, the magnetic particles can be ferromagnetic nanoparticles. In certain examples, the ferromagnetic nanoparticles can have an average particle size from about 5 nm to about 50 nm. In another example, the detailing agent can be capable of reducing the maximum temperature of polymer powder onto which the detailing fluid is applied.

The present disclosure also describes methods of making 3D printing articles. In one example, a method of making a 3D printed article can include iteratively applying individual build material layers of polymer particles to a powder bed. Based on a 3D object model, a fusible fluid can be selectively jetted onto individual build material layers. The fusible fluid can include a radiation absorber. A magnetic fluid can be jetted, based on the 3D object model, onto an area of the individual build material layers to form a magnetic pattern. The magnetic fluid can include magnetic particles. The powder bed can be exposed to electromagnetic energy to selectively fuse the polymer particles in contact with the radiation absorber at individual build material layers to form the 3D printed article encoded with the magnetic pattern. In a further example, the magnetic fluid can be jetted onto the areas of the individual build material layers before being fused by the electromagnetic energy. In another example, the magnetic pattern can be beneath an exterior surface of the 3D printed article, but within about 1 mm of the surface. In yet another example, the magnetic pattern can represent encoded data associated with identifying or authenticating the 3D printed article.

As explained herein, magnetic patterns can be formed on or in 3D printed articles by using a magnetic fluid during the process of making the 3D printed articles. In some examples, the magnetic pattern can be detected by a magnetic reader. The magnetic reader can often include a magnet to magnetize the magnetic particles in the magnet pattern. The reader can also include a circuit for sensing the magnetized particles. In some cases, the magnetic pattern can be moved past the reader to sequentially magnetize the magnetic pattern and then sense the magnetized pattern. The magnetic pattern can be designed such that the reader will sense a magnetic signal as the magnetic pattern moves past the reader and the magnetic signal can be converted into some type of useful information. For example, the magnetic pattern can include information identifying or authenticating the 3D printed article.

In some examples, the magnetic pattern and magnetic reader can operate similarly to magnetic ink character recognition (MICR) systems. This system has been used with negotiable documents such as checks. Checks usually include information printed in a MICR ink, such as routing numbers and account numbers. A check can be passed through a check reading machine, which magnetizes the MICR ink and then senses a magnetic signal from the magnetized MICR ink as the check passes through the reading machine. The information printed with MICR ink is often made up of special characters that are designed to produce an easily discernible magnetic signal for the check reader. The magnetic signal can be electronically converted to information about the check, such as the routing number or account number.

The 3D printed articles with magnetic patterns described herein can have the same utility in that the 3D printed articles can be scanned with a reader device to read information encoded in the magnetic pattern. However, the materials and methods described herein can also provide additional features. For example, the magnetic pattern can be formed at any location on or in the 3D printed article during the creation of the 3D printed article. The magnetic pattern can be formed on any surface of the 3D printed article or beneath the surface. In certain examples, the magnetic pattern can be beneath a surface of the 3D printed article, so that the magnetic pattern can be invisible to an observer examining the 3D printed article. Magnetic readers can still be capable of detecting the magnetic pattern beneath the surface. Such hidden magnetic patterns can be useful as covert markings encoding any information that is desired to be kept hidden. In some cases, the magnetic pattern can be used to verify the authenticity of the 3D printed part. The subsurface magnetic pattern can also be tamper-resistant, because such subsurface magnetic patterns can be difficult or impossible to alter without noticeably modifying the 3D printed article. In further examples, a subsurface magnetic pattern can be useful simply because the magnetic pattern can be present without marring the aesthetic appearance of the 3D printed article.

In further examples, the methods described herein can be used to form magnetic patterns in locations on the 3D printed article that would be difficult or impossible to print using surface printing methods. For example, the magnetic pattern can be located on any surface of the 3D printed article, such as the top, side, or bottom of the article. The magnetic pattern can be formed around or over complex geometries, including curved surfaces, surfaces with multiple corners, overhangs, within narrow constrictions, and so on.

Methods of Making 3D Printed Articles

The 3D printed articles described herein can be formed from a polymer powder build material using a process that involves jetting a fusible fluid onto layers of the polymer powder and then fusing the powder using electromagnetic energy. A magnetic fluid that includes magnetic particles can be selectively jetted in areas were the magnetic pattern is to be formed. FIG. 1 is a flowchart of one example method 100 of making a 3D printed article. The method includes: iteratively applying 110 individual build material layers of polymer particles to a powder bed; based on a 3D object model, selectively jetting 120 a fusible fluid onto individual build material layers, wherein the fusible fluid includes a radiation absorber; based on the 3D object model, selectively jetting 130 a magnetic fluid onto an area of the individual build material layers to form a magnetic pattern, wherein the magnetic fluid includes magnetic particles; and exposing 140 the powder bed to electromagnetic energy to selectively fuse the polymer particles in contact with the radiation absorber at individual build material layers to form the 3D printed article encoded with the magnetic pattern.

3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the magnetic pattern to be formed in or on the article. In other examples, the article can be defined by a first 3D object model and the magnetic pattern can be defined by a second 3D object model. Other information may also be included, such as structures to be formed of additional different materials or color data for printing the article with various colors at different locations on the article. The 3D object model may also include information or instructions specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, magnetic response strength, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusible fluid including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles. The magnetic pattern can be formed by applying a magnetic fluid to specific portions of individual powder layers. The magnetic fluid can include magnetic particles. When the individual powder layers are fused, the magnetic particles can form a composite with the fused polymer.

In some examples, a detailing fluid can be used together with the fusing fluid. The detailing fluid can be a fluid that reduces the maximum temperature of the polymer powder on which the detailing fluid is printed. In particular, the maximum temperature reached by the powder during exposure to electromagnetic energy can be less in the areas where the detailing fluid is applied. In certain examples, the detailing fluid can include a solvent that evaporates from the polymer powder to evaporatively cool the polymer powder. The detailing fluid can be printed in areas of the powder bed where fusing is not desired. In particular examples, the detailing fluid can be printed along the edges of areas where the fusing fluid is printed. This can give the fused layer a clean, defined edge where the fused polymer particles end and the adjacent polymer particles remain unfused. In other examples, the detailing fluid can be printed in the same area where the fusible fluid is printed to control the temperature of the area to be fused. In certain examples, some areas to be fused can tend to overheat, especially in central areas of large fused sections. To control the temperature and avoid overheating (which can lead to melting and slumping of the build material), the detailing fluid can be applied to these areas.

Figure 2:
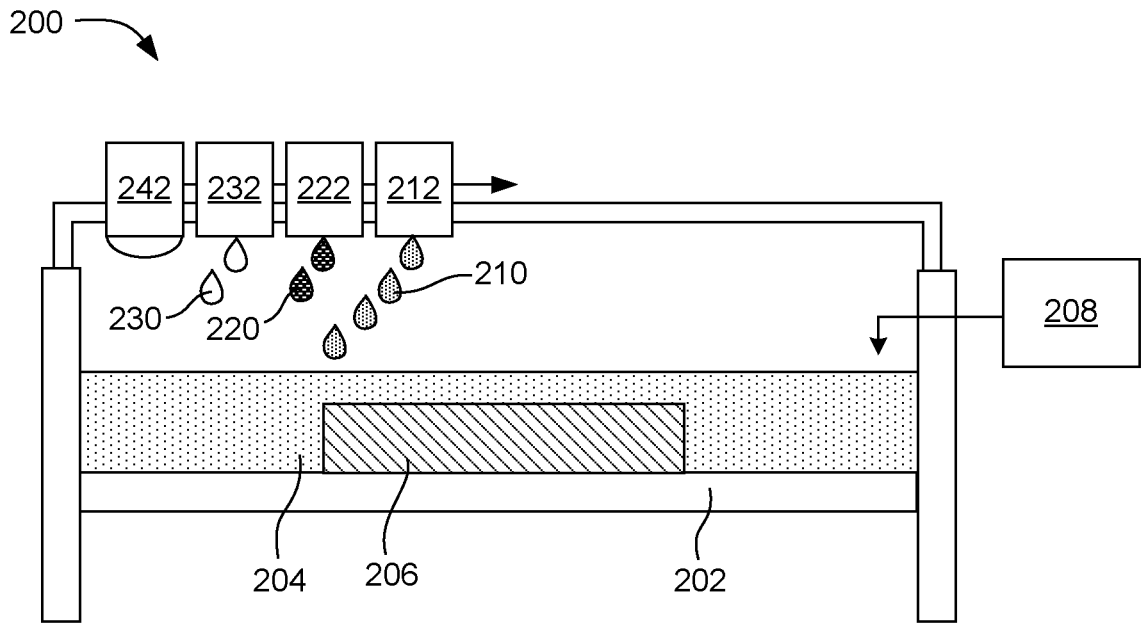
FIG. 2 is a schematic view of an example 3D printing system in accordance with the present disclosure.

One example illustrating a method of making a 3D printed article according to the present technology is shown in FIGS. 2-6. FIG. 2 shows a 3D printing system 200 that includes a build platform 202 supporting a powder bed of build material powder 204. A partially printed article 206 is made up of fused build material powder in the powder bed. This figure shows a cross-sectional view of the partially printed article and the powder bed. A layer of fresh build material powder is supplied from a build material supply 208 over the top of the partially printed article. Fluids are applied to the layer of fresh build material, including fusible fluid 210 from a fusible fluid jet 212, magnetic fluid 220 from a magnetic fluid jet 222, and detailing fluid 230 from a detailing fluid jet 232. The fluid jets are moveable within the printing system so that the fluid jets can move across the powder bed to apply the fluids in specific, desired locations. The system also includes an electromagnetic energy source 242.

Figure 3:
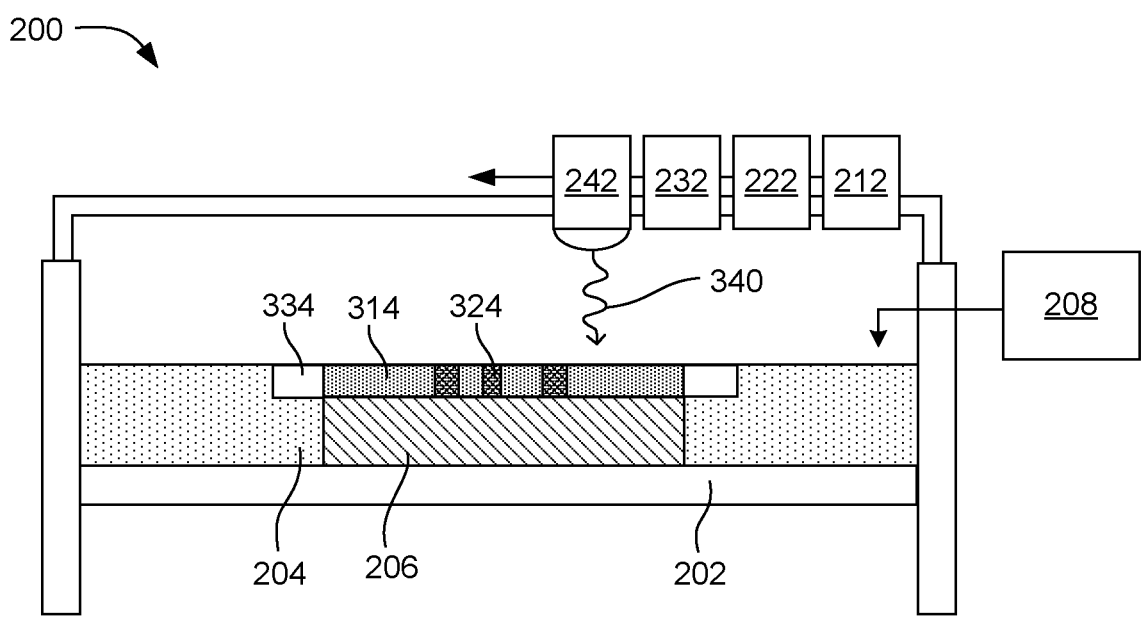
FIG. 3 is another schematic view of the example 3D printing system in accordance with the present disclosure.

FIG. 3 shows the 3D printing system 200 after the fluids have been jetted onto portions of the fresh build material powder 204. The top layer of build material now includes areas jetted with detailing fluid 334, areas jetted with fusible fluid 314, and areas jetted with magnetic fluid 324. In some cases, the fusible fluid can be jetted in all areas where the polymer powder is to be fused to form a solid material. In these cases, both the fusible fluid and the magnetic fluid can be jetted in areas that are to form a magnetic pattern. In other cases, the magnetic fluid may act as a radiation absorber so that the magnetic fluid can be printed alone and the magnetic fluid itself can facilitate fusing of the polymer powder in those areas. The powder bed can be exposed to electromagnetic energy 340 from an energy source 242, such as an infrared lamp.

Figure 4:
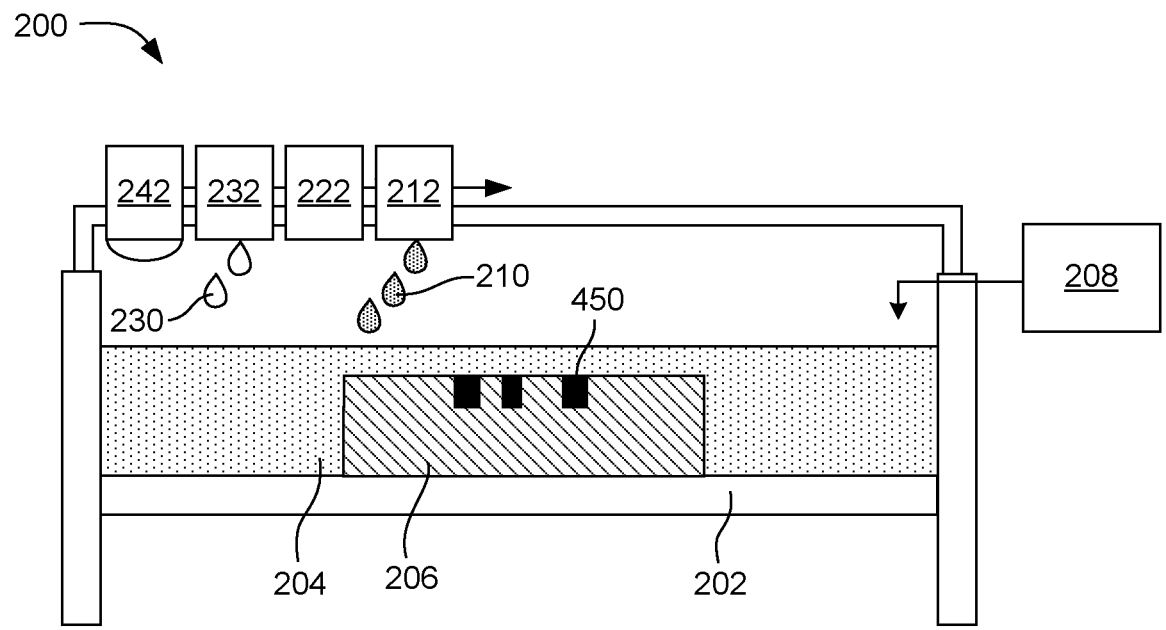
FIG. 4 is another schematic view of the example 3D printing system in accordance with the present disclosure.

FIG. 4 shows the 3D printing system 200 after fusing the top layer to form an additional layer of the partially printed article 206 now having a magnetic pattern 450 as a part of the top layer. A new layer of fresh build material powder 204 is supplied by the build material supply 208. The fusible fluid 210 and detailing fluid 230 are again jetted from the fusible fluid jet 212 and detailing fluid jet 232, respectively. However, no magnetic fluid is jetted onto this particular layer.

Figure 5:
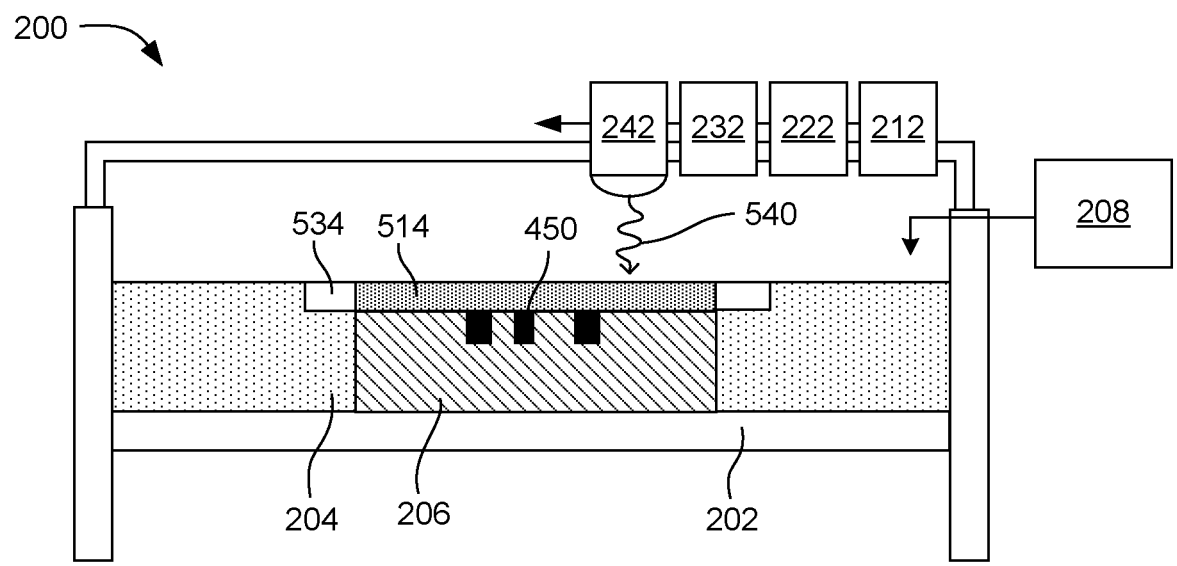
FIG. 5 is another schematic view of the example 3D printing system in accordance with the present disclosure.

FIG. 5 shows the 3D printing system 200 after jetting the fluids to form an area jetted with fusible fluid 514 and an area jetted with detailing fluid 534. The powder bed 204 is again exposed to electromagnetic energy 540 to fuse the area jetted with fusible fluid.

Figure 6:
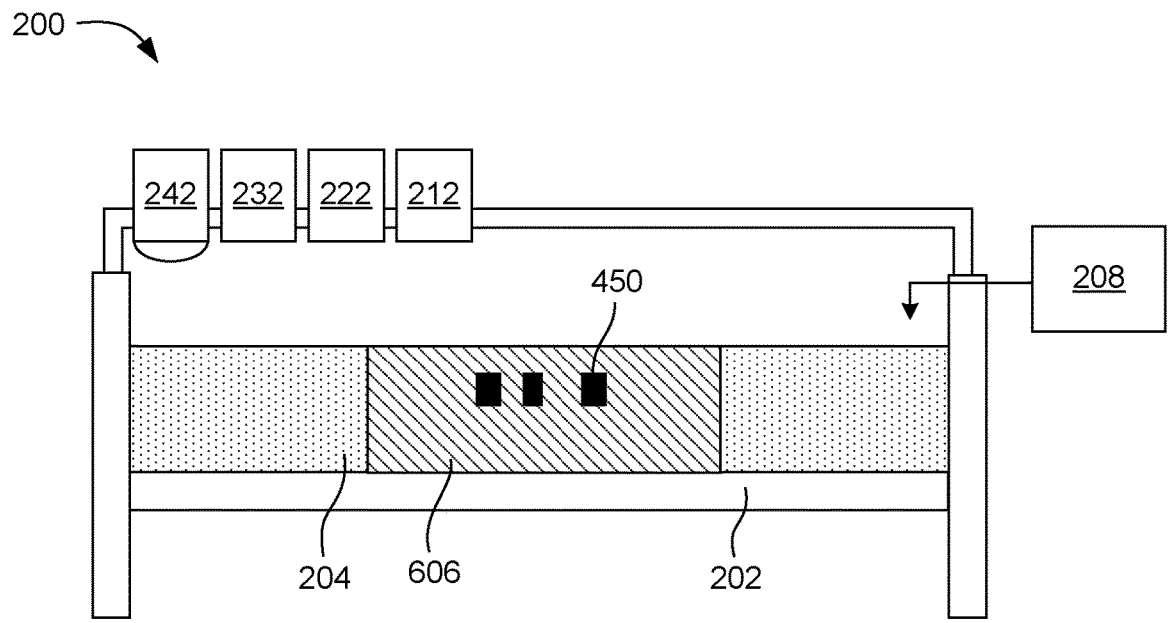
FIG. 6 is another schematic view of the example 3D printing system in accordance with the present disclosure.

FIG. 6 shows the 3D printing system 200 after fusing the final layer of the partially printed article to form a final printed article 606. The final printed article includes the magnetic pattern 450 embedded beneath the top surface of the article. As explained above, this magnetic pattern can represent information related to identifying or authenticating the 3D printed article. In some examples, the magnetic pattern can be read by moving the top surface of the 3D printed article past a magnetic reader that can magnetize the magnetic pattern and then sense a magnetic signal from the magnetic pattern.

Although the example shown above involves forming a magnetic pattern beneath the top surface of a 3D printed article, the methods described herein can be used to form magnetic patterns in a wide variety of locations on or within the 3D printed article. Generally, any 3D shape can be formed using the 3D printing methods described herein. Thus, the printed article itself and any magnetic portions of the printed article can have any desired 3D shape. Accordingly, magnetic patterns can be located at any surface of the article, including sides, bottom, top, and so on. The magnetic patterns can be located at any distance beneath the surface, or at the surface. In some examples, the magnetic pattern can be formed at a surface of the 3D printed article by jetting the magnetic fluid onto the polymer powder at the surface and then fusing the polymer powder to form a composite of fused polymer powder with embedded magnetic particles at the surface. In other examples, the polymer powder can be fused first and then the magnetic fluid can be jetted onto the surface of the fused layer to form a surface printed magnetic pattern.

Figure 7:
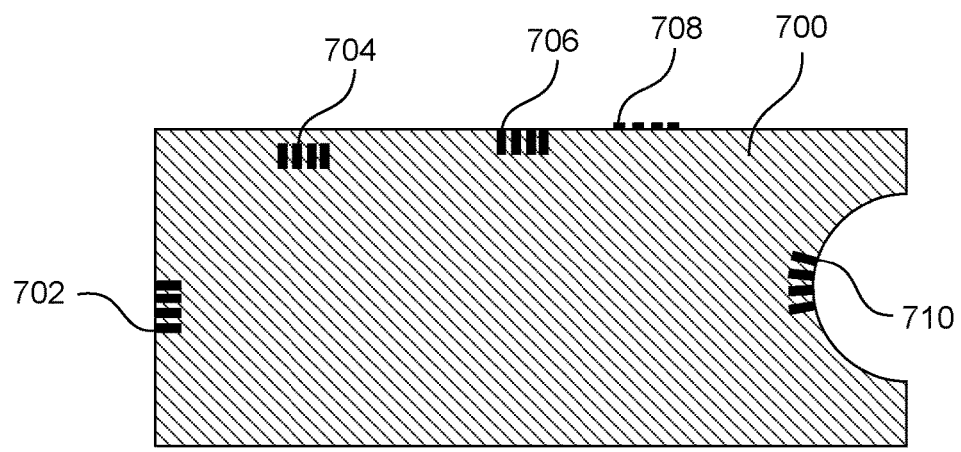
FIG. 7 is a cross-sectional view of an example printed article in accordance with the present disclosure.

FIG. 7 shows an example 3D printed article 700 having several magnetic patterns to illustrate various locations that magnetic patterns can be formed. A magnetic pattern 702 at a side surface of the 3D printed article can be formed by jetting magnetic fluid onto an area of the individual build material layers near the edge of the article. Thus, the edge of the article can be formed of layers of fused polymer particles having magnetic particles embedded therein. Another magnetic pattern 704 can be formed beneath the surface of the article using the method shown in FIGS. 2-6. A magnetic pattern 706 can be formed at the surface instead of beneath the surface by fusing magnetic particles into the final top layer of the article without adding an additional layer of polymer over the top of the magnetic pattern. A surface-printed magnetic pattern 708 can be formed by jetting the magnetic fluid onto the surface of the article after fusing the polymer powder. Finally, a magnetic pattern 710 can be formed at curved surfaces or on a surface having any type of complex geometry.

In some examples, the magnetic pattern can be located beneath an exterior surface of the 3D printed article, but within about 1 mm of the exterior surface. The exterior surface can be any surface of the 3D printed article that is accessible to a magnetic reader. The magnetic pattern can be placed beneath the surface because the layer of polymer over the magnetic pattern does not block the magnetic signal. However, in some cases keeping the distance beneath the surface to within about 1 mm can help ensure that the magnetic signal from the magnetic pattern is strong enough for the magnetic reader to detect. In further examples, the magnetic pattern can be from about 50 µm to about 1 mm beneath the surface, or from about 50 µm to about 500 µm beneath the surface. In alternative examples, the magnetic pattern can be deeper than about 1 mm beneath the surface.

In further examples, the magnetic pattern can represent some type of data. In certain examples, the magnetic pattern can represent encoded data associated with identifying or authenticating the 3D printed article. For example, the magnetic code may identify the 3D printed article in some way, such as identifying the manufacturer of the article, the date on which the article was made, the material used to make the article, and so on. In other examples, the data can pertain to the use of the article, such as identifying a part number of the article, instructions for using the article, instructions for placing the article in an assembly with other parts, and so on. In one example, the magnetic pattern can be readable by an automated assembly system, such as robots along an assembly line, so that the automated assembly system can identify the 3D printed article and correctly assemble the article with other parts. In another example, the magnetic pattern can encode directions to obtain additional information about the article or the manufacturer, such as a web address leading to a website with additional information. In further examples, the magnetic pattern can represent data for authenticating the article. The authentication data can include, for example, an authentication code, password, serial number, signature, manufacturer identifier, or other authentication data. In certain examples, the magnetic pattern can represent authentication data and the magnetic pattern can be located beneath a surface of the 3D printed article such that the magnetic pattern can act as a covert authentication measure.

In some examples, the magnetic pattern can be read by moving the 3D printed article across a magnetic reader. Alternatively, a magnetic reader can be moved over the surface of the 3D printed article. As an example, this type of system is used in MICR readers for reading MICR codes on checks. A check that is fed through a MICR reader first passes a magnet that temporarily magnetizes the MICR ink on the check. The magnetized ink characters then pass by a sensor that produces an electric signal that varies depending on the strength of the magnetic field from the magnetized ink. MICR characters on checks are printed in a special MICR font that was designed to produce unique waveforms for each character. The sensor signal is compared with the reference waveforms to determine which characters are printed on the check. In certain examples, the magnetic patterns used in the 3D printed articles described herein can also use the MICR font so that the characters can be readable with a MICR reader. In other examples, any other suitable protocol for encoding and decoding information from the magnetic pattern can be used.

In the case of MICR characters, the characters are moved or swiped past the sensor in a left-to-right direction, and the waveform produced by each character depends on the amount of MICR ink that moves past the sensor. Thus, the MICR font characters can include varying vertical cross sections so that the total amount of ink moving past the sensor varies in a specific pattern for each character. This type of sensing system can also be used with the 3D printed articles described herein. For example, a magnetic pattern on a 3D printed article can be swiped across a magnetizing magnet and sensor, and the waveform detected by the sensor can then be decoded to obtain the information encoded in the magnetic pattern. In further examples, the magnetic pattern can include elements having varying height or width to vary the total amount of magnetic particles moving past the sensor.

As mentioned above, individual layers of the 3D printed article can be formed by fusing the polymer powder build material. A fusible fluid can be applied to the polymer powder in areas to be fused, while a detailing fluid can be applied to areas to be cooled. The magnetic fluid can also be applied to form the magnetic pattern. These fluids are described in more detail below. 3D printing systems used to perform these printing methods can include an electromagnetic energy source to apply electromagnetic energy to fuse the polymer powder printed with the fusible fluid. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusible fluid while leaving the unprinted portions of the polymer powder below the fusing temperature.

In one example, the fusing lamp can be matched with the radiation absorber in the fusible fluid so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the three-dimensional (3D) printing system can also include preheaters for preheating the polymer powder to a temperature near the fusing temperature. In one example, the system can include a print bed heater to heat the print bed during printing. The preheat temperature used can depend on the type of polymer used. In some examples, the print bed heater can heat the print bed to a temperature from about 50° C. to about 250° C. The system can also include a supply bed, where polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the polymer powder, the absorbance of the radiation absorber, the preheat temperature, and the fusing temperature of the polymer, an appropriate amount of irradiation can be supplied from the electromagnetic energy source or fusing lamp. In some examples, the fusing lamp can irradiate each layer from about 0.1 to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

3D Printing Kits

Figure 8:
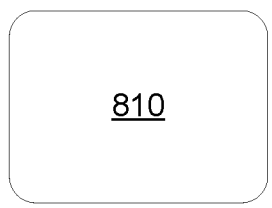
FIG. 8 is a schematic view of an example 3D printing kit in accordance with the present disclosure.

The present disclosure also extends to 3D printing kits that can include the fluids and build material used to perform the 3D printing methods described above. FIG. 8 shows an example 3D printing kit 800 that includes a powder bed material 810, a fusible fluid 820, and a magnetic fluid 830. The powder bed material can include polymer particles, as described above. In some examples, the fusible fluid can include water and a radiation absorber. The magnetic fluid can include magnetic particles. These materials can be used in 3D printing methods and systems as described above to form 3D printed articles with magnetic patterns. In particular, the fusible fluid and the magnetic fluid can be selectively applied to the powder bed material and layers of the powder bed material can be fused to form a 3D printed article. In further examples, the 3D printing kit can also include a detailing fluid. The detailing fluid can include a detailing agent. The detailing agent can be capable of reducing the maximum temperature of polymer powder onto which the detailing fluid is applied.

In some examples, the 3D printing kit can include powder bed material, a fusible fluid, and a magnetic fluid packaged together. In certain examples, the powder bed material can be in the form of a container or bag of loose powder material. In other examples, the powder bed material can be in a cartridge designed to fit in a specific 3D printing system. Similarly, the fusible fluid and magnetic fluid can be in cartridges designed for use with a specific 3D printing system, or the fluids can be in another package such as bottles.

Powder Bed Materials

In certain examples, the powder bed material can include polymer particles having a variety of shapes, such as substantially spherical particles or irregularly-shaped particles. In some examples, the polymer powder can be capable of being formed into 3D printed parts with a resolution of about 20 µm to about 100 µm, about 30 µm to about 90 µm, or about 40 µm to about 80 µm. As used herein, "resolution" refers to the size of the smallest feature that can be formed on a 3D printed part. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). Other resolutions along these axes can be from about 30 µm to about 90 µm, or from 40 µm to about 80 µm.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be selected from the group consisting of nylon 6 powder, nylon 9 powder, nylon 11 powder, nylon 12 powder, nylon 66 powder, nylon 612 powder, polyethylene powder, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, and mixtures thereof. In a specific example, the polymer powder can be nylon 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 10:1 to about 1:2 or from about 5:1 to about 1:1.

Fusible Fluids

In further examples, the fusible fluid can include a radiation absorber that is capable of absorbing electromagnetic radiation to produce heat. The radiation absorber can be colored or colorless. In various examples, the radiation absorber can be glass fiber, titanium dioxide, clay, mica, talc, barium sulfate, calcium carbonate, a near-infrared absorbing dye, a near-infrared absorbing pigment, a dispersant, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $CuZSi_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of radiation absorber in the fusible fluid can vary depending on the type of radiation absorber. In some examples, the concentration of radiation absorber in the fusible fluid can be from about 0.1 wt % to about 20 wt %. In one example, the concentration of radiation absorber in the fusible fluid can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusible fluid such that after the fusible fluid is printed onto the polymer powder, the amount of radiation absorber in the polymer powder can be from about 0.0003 wt % to about 10 wt %, or from about 0.005 wt % to about 5 wt %, with respect to the weight of the polymer powder.

Magnetic Fluids

In some examples, the magnetic fluid can include magnetic particles. The magnetic particles can be detected by a magnetic reader as explained above. In some cases the magnetic particles may not have a magnetic field when printed, but the particles can be magnetizable so that the particles can have a magnetic field when the sensor of the magnetic reader passes over the magnetic pattern. Accordingly, in various examples, the magnetic particles can be made from a material that either has an inherent permanent magnetic field or can be magnetized to allow the magnetic particles to be detected by the magnetic reader. Non-limiting examples of magnetic particle materials can include Fe, $Fe_3O_4$, $Fe_2O_3$, Co, Ni, $Nd_2Fe_{14}B$, $Y_2Fe_{14}B$, or combinations thereof. In one particular example, the magnetic particles can include a mixture of $Fe_3O_4$ and $Fe_2O_3$.

In certain examples, the magnetic particles can be ferromagnetic nanoparticles. The magnetic particles can often have an average particle size that is smaller than the average particle size of the powder bed material. Thus, when the magnetic fluid is jetted onto the powder bed, the magnetic particles can penetrate between the powder particles. In some examples, the magnetic particles can have an average particle size from about 5 nm to about 50 nm. In further examples, the average particle size can be from about 8 nm to about 20 nm. The concentration of the magnetic particles in the magnetic fluid can be sufficient to form a detectable concentration of the magnetic particles in the powder bed when the magnetic fluid is jetted onto the powder bed. In certain examples, the concentration of magnetic particles in the magnetic fluid can be from about 5 wt % to about 50 wt %. In further examples, the concentration can be from about 10 wt % to about 40 wt % or from about 20 wt % to about 35 wt %.

In certain examples, the magnetic fluid can be a MICR ink. In some cases, the magnetic fluid can include a colorant such as a black colorant. However, in some examples the magnetic patterns formed using the methods described herein are not visible. Therefore, the magnetic fluid may not include a colorant in some examples. Additionally, in some cases the magnetic particles naturally impart a color to the magnetic fluid. In further examples, the magnetic fluid can include a binder, such as a water soluble polymer or a polymer emulsion. However, in some examples the magnetic fluid can be printed on polymer powder that is to be fused. Therefore, the magnetic particles from the magnetic fluid can be held in place in the fused polymer without any binder in the magnetic fluid. Thus, in some examples the magnetic fluid may not include a binder. In further examples, the magnetic fluid can include a liquid vehicle, dispersant, surfactant, and other components for increasing the jettability of the fluid as described with respect to the other fluids herein.

Detailing Fluids

The detailing fluid can include a detailing agent capable of cooling the polymer powder in portions of the powder bed onto which the detailing fluid is printed. In some examples, the detailing fluid can be printed around the edges of the portion of the powder that is printed with the fusible fluid. The detailing fluid can increase selectivity between the fused and unfused portions of the powder bed by reducing the temperature of the powder around the edges of the portion to be fused.

In some examples, the detailing agent can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. Thus, the detailing agent can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing fluid can include xylene, methyl isobutyl ketone, 3-methoxy-3-methyl-1-butyl acetate, ethyl acetate, butyl acetate, propylene glycol monomethyl ether, ethylene glycol mono tert-butyl Ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In further examples, the detailing agent can be substantially devoid of radiation absorbers. That is, in some examples, the detailing agent can be substantially devoid of ingredients that absorb enough energy from the light source to cause the powder to fuse. In certain examples, the detailing fluid can include colorants such as dyes or pigments, but in small enough amounts that the colorants do not cause the powder printed with the detailing fluid to fuse when exposed to the light source.

The components of the above described fluids, e.g., fusible fluids, magnetic fluids, and detailing fluids, can be selected to give the respective fluids good fluid jetting performance and the ability to fuse the polymer bed material. Thus, these fluids can include a liquid vehicle. In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di) esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulations of this disclosure, as mentioned, various other additives can be employed to enhance certain properties of the fluid compositions for specific applications. Examples of these additives are those added to inhibit the growth of harmful microorganisms. These additives may be biocides, fungicides, and other microbial agents, which can be used in various ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Multi-Fluid Kits for 3D Printing

The present disclosure also extends to multi-fluid kits for 3D printing. In some examples, a multi-fluid kit for 3D printing can include: a fusible fluid that includes water and a radiation absorber; a magnetic fluid that includes water and magnetic particles; and a detailing fluid that includes a detailing agent. In certain examples, the radiation absorber can be capable of absorbing electromagnetic radiation to produce heat. In further examples, the fusible fluid can be colorless. In one example, the magnetic particles can be ferromagnetic nanoparticles. The ferromagnetic nanoparticles can have an average particle size from about 5 nm to about 50 nm. In another example, the detailing agent can be capable of reducing the maximum temperature of polymer powder onto which the detailing fluid is applied. In further examples, the fusible fluid, magnetic fluid, and detailing fluid can include any of the ingredients described above.

Figure 9:
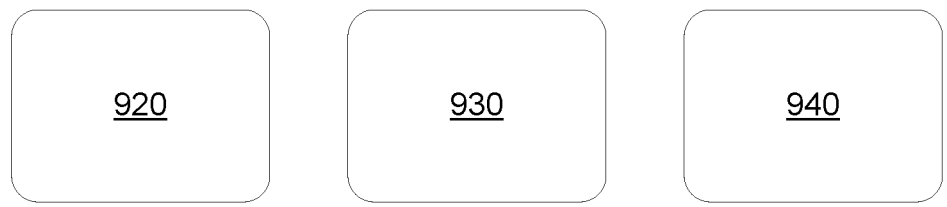
FIG. 9 is a schematic view of an example multi-fluid kit for 3D printing in accordance with the present disclosure.

FIG. 9 shows an example multi-fluid kit 900 for 3D printing. The multi-fluid kit for 3D printing includes a fusible fluid 920, a magnetic fluid 930, and a detailing fluid 940. Similar to the 3D printing kits described above, in some examples the multi-fluid kit can be packaged with the various fluids together. In some examples, the fluids can be in cartridges designed for use with a specific 3D printing system. In other examples, the fluids can be in a bulk container such as bottles and the fluids can be transferred into a 3D printing system for use.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if each numerical value and sub-range is explicitly recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

In the present disclosure, it is noted that when discussing the methods and kits described herein, each of these discussions can be considered applicable to each of these examples, whether or not they are explicitly discussed in the context of that example. Thus, for example, in discussing details about the methods of making 3D printed articles, such discussion also refers to the 3D printing kits and multi-fluid kits, and vice versa.

Examples

Two sample rectangular polymer sheets were formed using an HP Multi Jet Fusion® test bed. The powder bed material was a nylon-12 powder with a particle size ranging from about 10 µm to about 100 µm. The samples were formed by fusing together individual layers of polymer particles, with a layer height of about 70 µm to about 100 µm. For the first sample, a magnetic pattern was formed by printing a magnetic fluid on the surface layer of the sample before fusing the layer. The magnetic pattern included several parallel strips printed with the magnetic fluid separated by strips of polymer and fusing fluid without added magnetic fluid. In the second sample, the same magnetic pattern was formed with an additional layer of polymer powder, about 100 µm thick, spread over the magnetic pattern and then fused to form a layer of non-magnetic polymer covering the magnetic pattern. The magnetic fluid was VersaInk® MICR ink (Diversified Productivity Solutions, Ltd., California) and the fusible fluid was a black pigmented ink. The same test was repeated using a MICR ink available from HP, Inc. (Colorado).

A magnetic reader was constructed using a sensor taken from a check reader. A flat magnet was placed next to the sensor, and the sample polymer sheets were swiped across the magnet and the sensor. The samples were oriented so that the magnetic strips would be magnetized by the magnet first and then pass over the sensor, so that the sensor would detect the magnetic field of the magnetic strips with a separation of signal caused by a lack of magnetic field of the non-magnetic polymer between the magnetic strips.

For all samples, a clear electric signal was produced by the sensor in response to the magnetic strips. The signal included high peaks at the beginning of each magnetic strip and low peaks at the beginning of each non-magnetic strip of the samples. These results indicate that magnetic patterns formed on or in 3D printed articles using the methods described herein can be detected with a magnetic reader, whether the magnetic patterns are on a surface of the 3D printed articles or beneath the surface. The patterns were successfully detected with both the VersaInk® MICR ink samples and the HP MICR ink samples.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A multi-fluid kit for 3D printing, comprising:
a fusible fluid including water and a radiation absorber;
a magnetic fluid including water and magnetic particles, wherein the magnetic particles are selected from the group consisting of Fe, Co, Ni, $Nd_2Fe_{14}B$, $Y_2Fe_{14}B$, and a combination thereof; and
a detailing fluid including a detailing agent.

2. The multi-fluid kit of claim 1, wherein the radiation absorber is selected from the group consisting of carbon black, a near-infrared absorbing dye, a near-infrared absorbing pigment, a tungsten bronze, a molybdenum bronze, metal nanoparticles, a conjugated polymer, and combinations thereof.

3. The multi-fluid kit of claim 1, wherein the radiation absorber is present in an amount ranging from about 0.1 wt % to about 20 wt %, based on a total weight of the fusible fluid.

4. The multi-fluid kit of claim 1, wherein the magnetic particles have an average particle size ranging from about 5 nm to about 50 nm.

5. A multi-fluid kit for 3D printing, comprising:
a fusible fluid including water and a radiation absorber, wherein the radiation absorber includes a carbon black pigment;
a magnetic fluid including water, magnetic nanoparticles, and a colorant, wherein the magnetic nanoparticles are selected from the group consisting of Fe, Co, Ni, $Nd_2Fe_{14}B$, $Y_2Fe_{14}B$, and combinations thereof; and
a detailing fluid including a detailing agent.

6. The multi-fluid kit of claim 5, wherein the magnetic nanoparticles have an average particle size ranging from about 5 nm to about 50 nm.

7. The multi-fluid kit of claim 1, wherein the fusible fluid is colorless.

8. The multi-fluid kit of claim 1, wherein the magnetic fluid is free of a binder.

9. The multi-fluid kit of claim 1, wherein the detailing agent is a solvent selected from the group consisting of xylene, methyl isobutyl ketone, 3-methoxy-3-methyl-1-butyl acetate, ethyl acetate, butyl acetate, propylene glycol monomethyl ether, ethylene glycol mono tert-butyl Ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, and combinations thereof.

10. The multi-fluid kit of claim 1, wherein the magnetic fluid includes a liquid vehicle including the water and at least one of a co-solvent, a surfactant, a dispersant, and combinations thereof.

11. The multi-fluid kit of claim 1, wherein the fusing fluid includes a liquid vehicle including the water and at least one of a co-solvent, a surfactant, a dispersant, and combinations thereof.

12. The multi-fluid kit of claim 5, wherein the colorant of the magnetic fluid is a black colorant.

13. The multi-fluid kit of claim 5, wherein the magnetic fluid is free of a binder.

14. The multi-fluid kit of claim 5, wherein the detailing agent is a solvent selected from the group consisting of xylene, methyl isobutyl ketone, 3-methoxy-3-methyl-1-butyl acetate, ethyl acetate, butyl acetate, propylene glycol monomethyl ether, ethylene glycol mono tert-butyl Ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, and combinations thereof.

15. The multi-fluid kit of claim 5, wherein the magnetic fluid includes a liquid vehicle including the water and at least one of a co-solvent, a surfactant, a dispersant, and combinations thereof.

16. The multi-fluid kit of claim 5, wherein the fusing fluid includes a liquid vehicle including the water and at least one of a co-solvent, a surfactant, a dispersant, and combinations thereof.

* * * * *